United States Patent
Thompson (10) Patent No.: US 6,206,480 B1
(45) Date of Patent: Mar. 27, 2001

(54) MOBILE COMPUTING AND COMMUNICATION SYSTEM

(76) Inventor: Eric Thompson, 14206 SE. 165th Pl., Renton, WA (US) 98058

( * ) Notice: Subject to any disclaimer, the term of this patent is extended or adjusted under 35 U.S.C. 154(b) by 0 days.

(21) Appl. No.: 09/048,830

(22) Filed: Mar. 25, 1998

Related U.S. Application Data (60) Provisional application No. 60/041,590, filed on Mar. 25, 1997.

(51) Int. Cl.[7] .................................................. H05K 5/00
(52) U.S. Cl. ..................... 301/625; 361/683; 361/686; 361/687; 220/334; 220/335; 346/145; 364/704; 206/320
(58) Field of Search ................... 361/679–687, 361/724–730, 752–759, 825, 827, 829; 364/705.01, 708, 708.1, 706.1; 206/320, 305, 523, 576, 214, 223, 328, 449; 190/9, 11, 107, 102, 109, 110, 119, 16, 17, 31, 35, 115, 900; 346/145; 400/691, 685, 88, 69, 680, 682; 307/29, 66; 312/208, 223.3; 248/183, 503, 503.1, 183.1–183.4; 297/188.01; 379/58, 447, 428, 440, 433; 224/275, 929; 455/90, 74, 85, 128, 403; 200/320, 305, 334, 523, 576

(56) References Cited

U.S. PATENT DOCUMENTS

| | | | | |
|---|---|---|---|---|
| 4,769,764 | * | 9/1988 | Levanon | 364/708 |
| 4,790,431 | * | 12/1988 | Reel et al. | 206/305 |
| 4,837,590 | * | 6/1989 | Spague | 346/145 |
| 4,896,776 | * | 1/1990 | Kabanuk | 206/576 |
| 5,212,628 | * | 5/1993 | Bradbury | 361/395 |
| 5,214,574 | * | 5/1993 | Chang | 361/393 |
| 5,227,953 | * | 7/1993 | Lindgerg et al. | 361/393 |
| 5,242,056 | * | 9/1993 | Zia et al. | 206/576 |
| 5,442,512 | * | 8/1995 | Bradbury | 361/683 |
| 5,552,957 | * | 9/1996 | Brown et al. | 361/683 |
| 5,590,022 | * | 12/1996 | Harvey | 361/683 |
| 5,647,484 | * | 7/1997 | Fleming | 206/576 |
| 5,666,265 | * | 9/1997 | Lutz et al. | 361/683 |
| 5,717,567 | * | 2/1998 | Tao | 361/683 |
| 5,719,936 | * | 2/1998 | Hillenmayer | 379/447 |
| 5,764,475 | * | 6/1998 | Levander | 361/683 |
| 5,883,820 | * | 3/1999 | Ota et al. | 364/704 |
| 5,966,285 | * | 10/1999 | Sellers | 361/686 |

FOREIGN PATENT DOCUMENTS

408087351 * 4/1996 (JP) ................ G06F/001/16

\* cited by examiner

Primary Examiner—Leo P. Picard
Assistant Examiner—Michael Datskovsky
(74) Attorney, Agent, or Firm—J. Michael Neary (57) ABSTRACT

A dual, or single, case mobile computing and communication system with rapid mobility for usage in the field, consisting of a component mounting mechanism, a mobile computer and peripheral data switching micronetwork, an enclosed modular peripheral power system, and a plug-in modular component card system. The universal mounting mechanism holds multiple peripherals in such a way that they can be easily and quickly installed and removed from the case configuration. It locks the peripherals so they do not move during transportation. It is also low in profile so it does not obstruct the use of the items being held. The system offers rapid reaction mobility, by isolating and securing the many data and power cables necessary to connect up to 8 peripherals. The data part of this micronetwork includes data switching to connect the single computer's parallel and serial interface to these peripherals. The power system is modular and supports unique power outputs to multiple devices from either a single AC or DC input. The invention combines multiple modular component cards that snap together allowing ease of use and quick field exchange of panels for the system.

19 Claims, 11 Drawing Sheets

MOBILE COMPUTING AND COMMUNICATION SYSTEM

This Appln claims the benefit of US Provisional No. 60/041,590 filed Mar. 25, 1997.

BACKGROUND OF THE INVENTION

1. Field of the Invention

This invention relates to a mobile modular computing and communication system, consisting of a computer and supporting peripherals integrated in one or more transportable cases or enclosures. The cases include fully integrated data and power systems to support mobile computing and communication applications.

2. Background Art

Portable computing systems and other systems-designed to deploy electronic, medical, data entry, and remote sensing technology in a mobile enclosure are readily available in many forms. Some have even included a power system to support the computer and/or peripherals in the case. However, several problems faced by integrators and end users when deploying and using mobile systems have remain unsolved. For example, the needs of some mobile users of mobile modular computing and communication system are not satisfied by a single portable computer, and in addition have a need to deploy several additional peripherals that need both power supply and data connections to the portable computer. Such devices may include scanners and digital cameras to collect imagery and other data, as well as cellular, satellite, and/or encryption technology to facilitate communications. Terrestrial infrastructure in some field-deployed situations is very limited. In some cases, a single AC or DC source is available, but in many other cases battery power must be used. Therefore, the system with the multiple peripherals must be made operational with either a battery or form a single AC or DC power source connection.

Many field users have no access to a technician or service facilities. Therefore, the integrated case system also needs to be modular, allowing easy and rapid removal and replacement of components in the field.

Mobile system users need to make their system field-operational as quickly and easily as possible. Connecting and disconnecting data and power cables each time the system is used may cause system failure, cable loss, and end user confusion as well as delay during setup. The problems can be severely exacerbated when setting up the system in low light conditions, or in conditions of high stress or time urgency. Mobile systems without an integrated case enclosure and locked-down cable structure present the user with a confusing array of tangled cables and connectors that are difficult to sort out in the field, and may delay setting up the system. Worse yet, many of these loose parts can be lost. At the same time, permanent fasteners are not appropriate, as the user may need to remove the peripheral for use outside the case system, or replace it with a repaired or an upgraded component. Therefore, a new connection technology is needed that gives both a stable support as well as quick and easy release when the mounted object needs removal. The integrated system needs a design and dimension facilitating comfortable ergonomic operation of the system on a desktop surface.

SUMMARY OF THE INVENTION

Accordingly, it is an object of this invention to provide a mobile computing and communication system that can be made field-operational quickly and easily with little or no cable routing and without need to rely on external power supplies if none are available. Another object of this invention is to provide a method of assembling a modular data processing and communication system that minimizes cost and provides for maximal flexibility in making repairs and installing upgraded components. Still another object of this invention is to provide a process of performing data processing and communication functions, such as digital imaging, scanning, printing, copying, secure and open voice and digital communications and data backup that obviates the need for a mass of external cables.

These and other objects of the invention are attained in a mobile modular computing and communication system having modular components enclosed within one or more cases, and connected by a stable mechanical connection to the main structure of a case, i.e. a modular physical connector system. The mechanical connection provides the capability of quickly and easily installing and later removing these components. This mechanical connection is a universal mount that can be applied to objects of differing shapes and sizes. In general terms, the a dual or single case containing components constituting a mobile computing and communication system. These include a computer and component mounting technology, a mobile computer and peripheral data switching micronetwork, an enclosed modular peripheral power system, and a plug-in modular component card system.

Once the devices are mechanically attached, two categories of connections are provided: a data connection and a power connection. These connections are part of a micronetwork. The micronetwork is a microcosm of the larger network used in the office environment to connect the desktop PC to peripherals and local area network resources, i.e. printers and modems. Several methods of data connection can be used: 1) Serial-9 pin or 25 pin, 2) Parallel 25 pin, 3) Universal Serial Bus (USB), 4) PC Card SCSI, 5) Firewire 1394, and 6) Direct modem or 7) Ethernet interface on the outside of the mobile computer. To facilitate connection between the single serial and parallel port on the laptop to multiple serial and parallel peripherals, data switching of these connections is provided. Although the USB interface does not require switching, a USB hub is integrated to allow the connection of multiple USB devices. Cable connections to either a Firewire 1394 port, a modem port or a direct network connection are provided as part of this micronetwork. These connections are done with cabling that is secured to the system, routed appropriately to support needed connections, reducing cabling congestion and preventing loss or damage to cables.

Power systems are provided to the computer and peripherals in the system. This power source is not standard and thus each device needs its own specific power source, i.e. 14 Volts @ 2.5 Amperes.

The mounting system enables continual updating and upgrading of the components in the system to the most recent technology. The enclosure system support modularity so these upgrades can be accomplished without replacing the entire system. Field replacement of components is possible to allow easy repair of the system.

The universal mounting mechanism holds multiple peripherals in position for immediate use when the cases are opened, and also in such a way that they can be easily and quickly installed and removed from the case configuration. The mechanism locks the peripherals so they do not move during transportation. The mechanism holding the system is also low in profile so it does not obstruct the use of the items being held or raise the elevation too high to make the system difficult to use when placed on a standard height work surface. The support mount has surfaces on two sides that prevent horizontal movement. The third surface is held in place by a small plate that can be unlocked and rotated out of the way when the peripheral needs removal.

This invention offers rapid reaction mobility, by providing a micronetwork that isolates, secures and simplifies the many data and power cables necessary to connect multiple peripherals. The data part of this micronetwork includes data switching to connect the single computer's parallel and serial interface to multiple peripherals. Furthermore, the integrated USB hub allows even more data connectivity and a simple USB bus structure within the system. The power part of the micronetwork directs power cables from the central power source to the peripherals. The power system included in our invention is modular and supports unique power outputs to multiple devices from either a single AC or DC power source.

The universal mounting mechanism and portions of the micronetwork are combined in an integrated fashion in multiple modular component cards which snap together allowing ease of use and quick field exchange of panels for the system.

BRIEF DESCRIPTION OF THE DRAWINGS

FIG. 6 is a front perspective view of a mounting mechanism holding an electronic component, such as a laptop computer, peripheral or the like.

DETAILED DESCRIPTION OF THE PREFERRED EMBODIMENT

This system invention is primarily a dual-case solution with an option for a single-case configuration. The computer and printer are fully functional in case 1, while the other peripherals are accessible and usable in the case 2. These become transportable when lids 32 and 34 are attached. The system capabilities include processing data, scanning and digital imagery input, secure and unclassified voice and data communications, Global Positioning input, printing, and copying. All of these functions can be accomplished independent of any terrestrial infrastructure. The system innovation includes several individual solutions described in more detail below.

A single power cable 3 connects the main case 1 to the peripheral case 2 and carries power to the peripherals in the peripheral case 2. A parallel cable 52 and a serial cable 53 make the data connection between the two cases. The two-case solution is presented in FIGS. 1 through 3 below. Within each case, data and power are routed through an integrated micronetwork, as described below.

Figure 1:
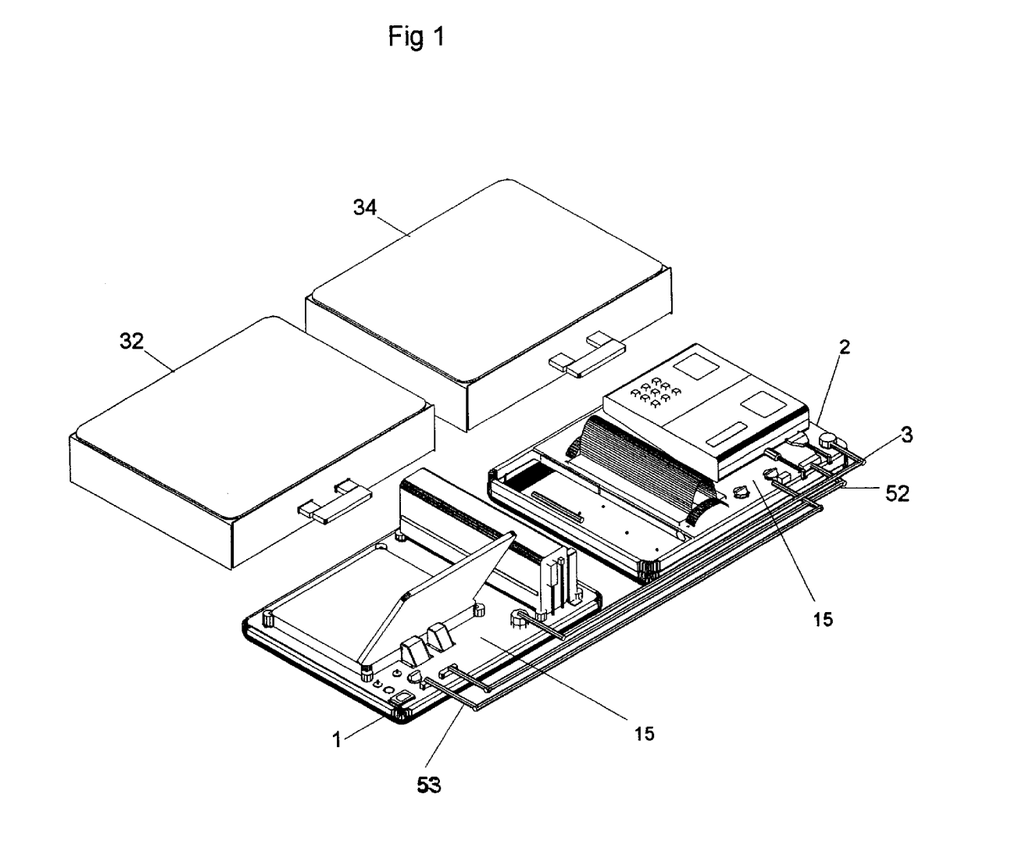
FIG. 1 is a perspective view from the rear of the two-case system, deployed and operational with lids removed and connecting cables attached.

The system shown in FIG. 1 includes the main case 1 with a base 15, peripheral case 2 with a base 27, data connections 52 and 53, and power cable 3. The cases are set up for working condition. The details are given in the following figures.

Figure 2:
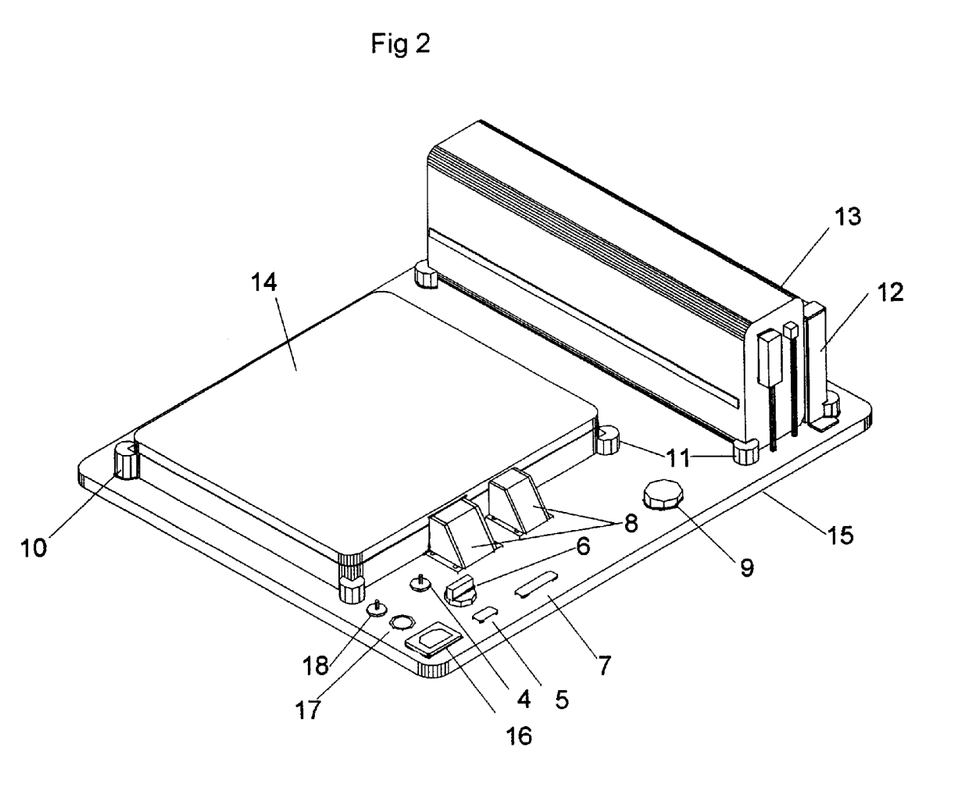
FIG. 2 is a rear perspective view of the main case shown in FIG. 1, with lid removed, with a laptop computer and a printer mounted.
Figure 3:
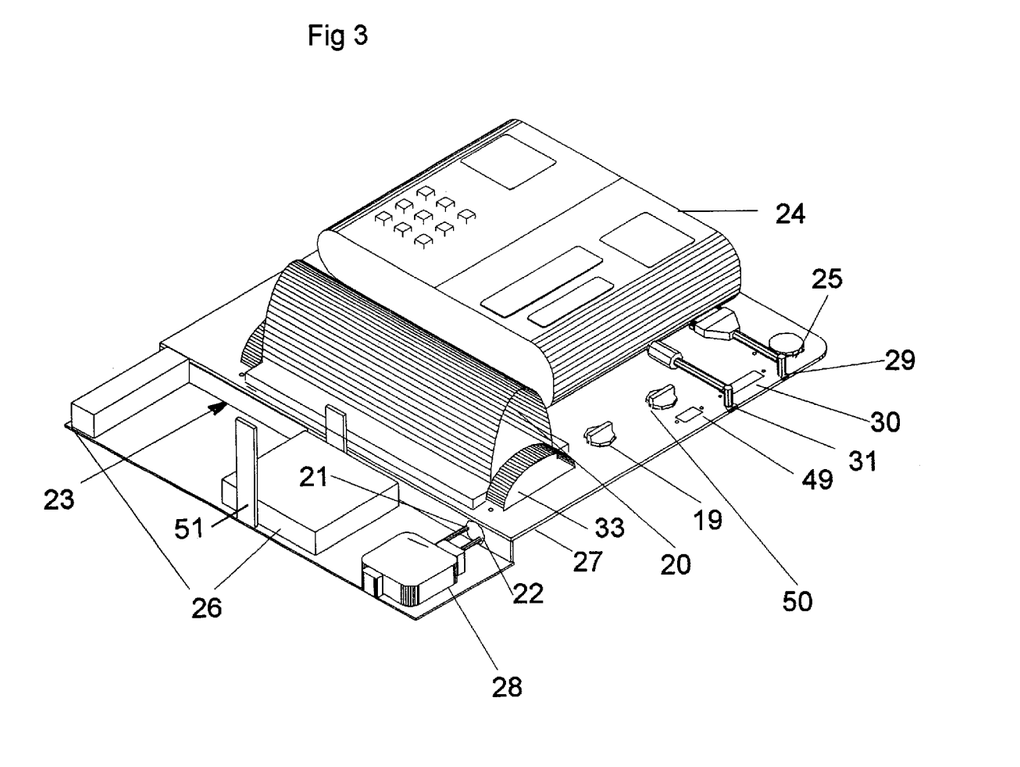
FIG. 3 is a rear perspective view of the peripheral case shown in FIG. 1, with lid removed, with a telephone and a scanner mounted.
Figure 4:
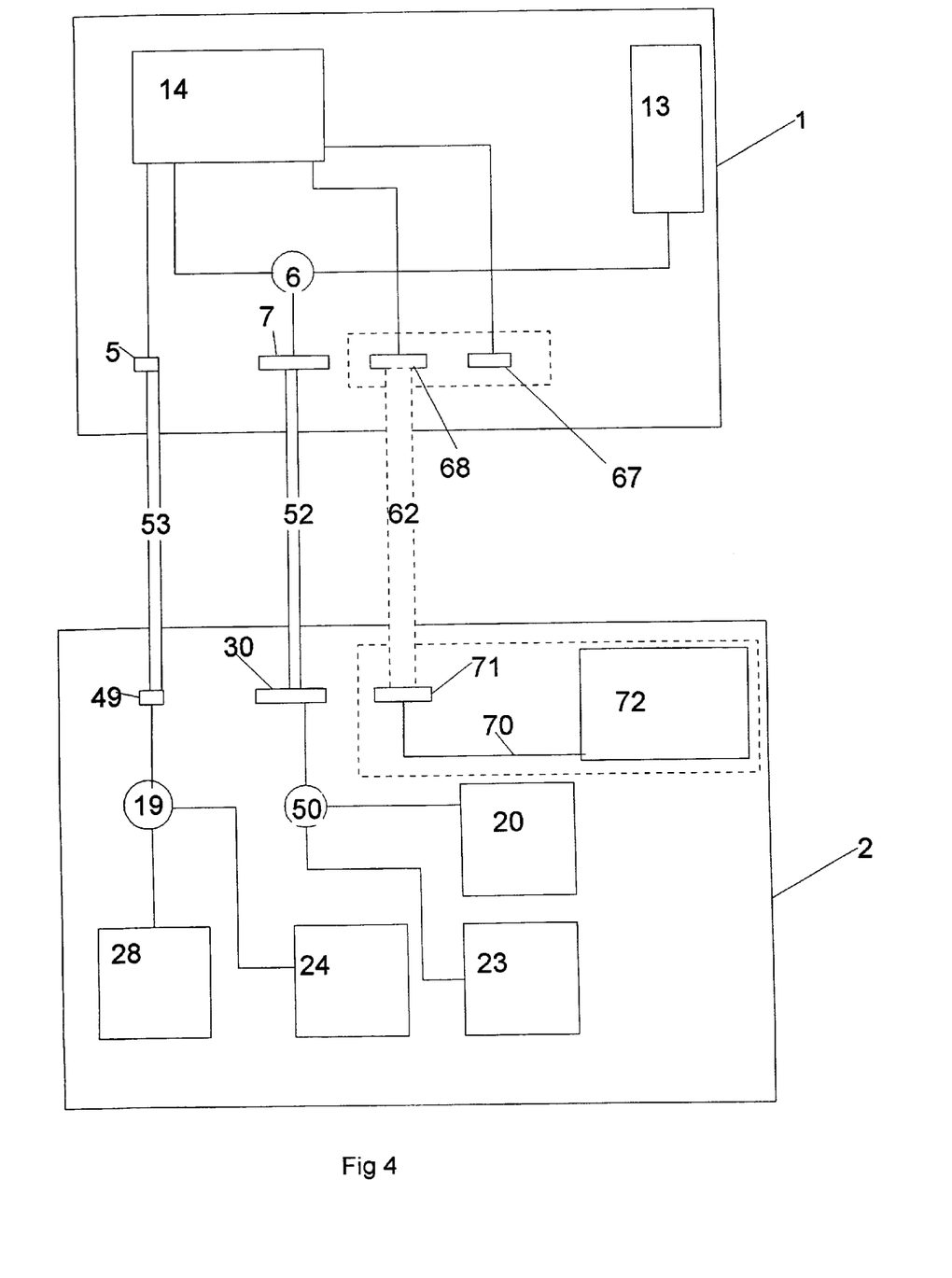
FIG. 4 is a data distribution and switching wiring diagram.
Figure 5:
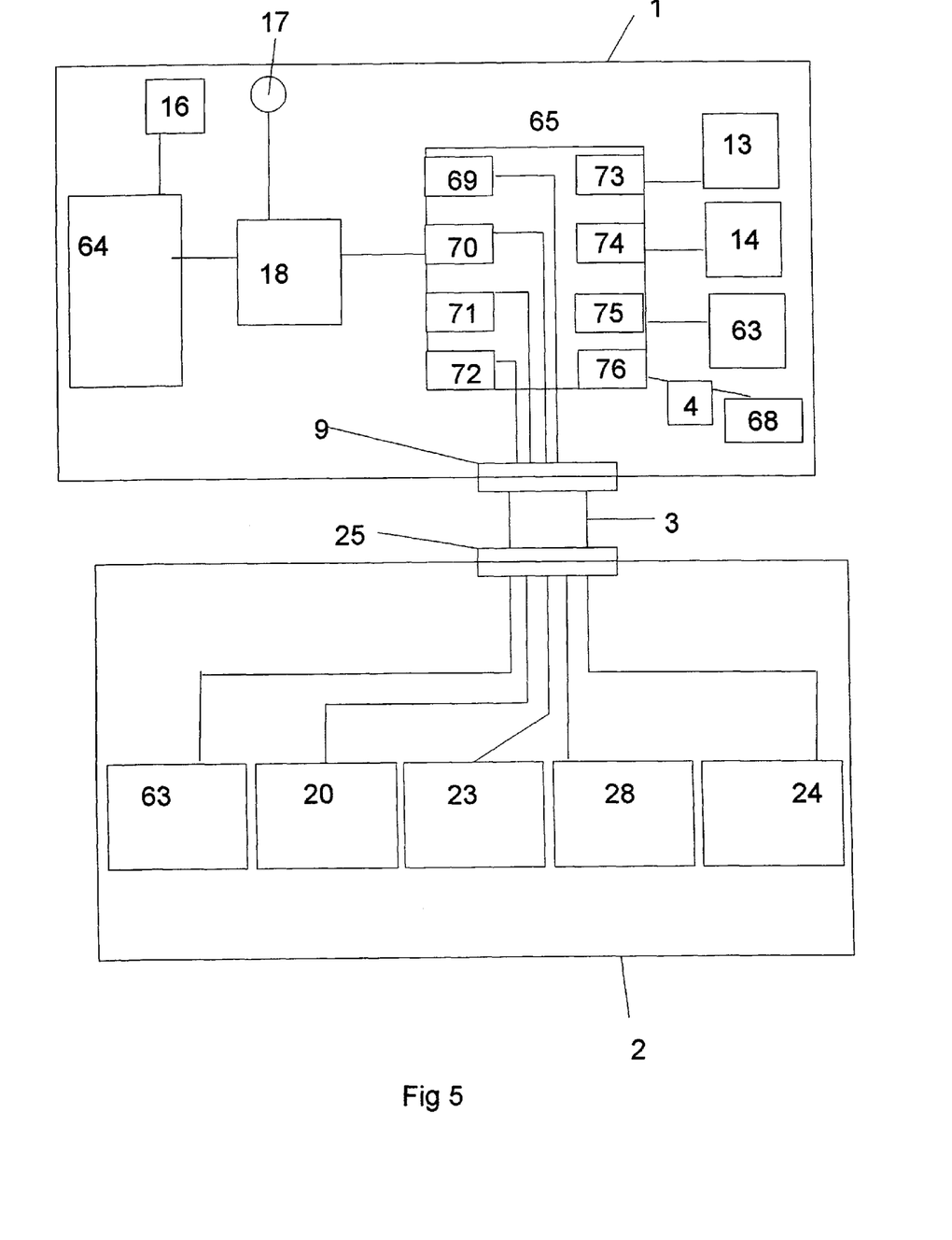
FIG. 5 is a wiring diagram for the power supply.

FIGS. 2 and 3 support the description of the cases and their peripherals. FIGS. 4 and 5 represent data and power connections and supplement FIGS. 2 and 3.

Figure 13:
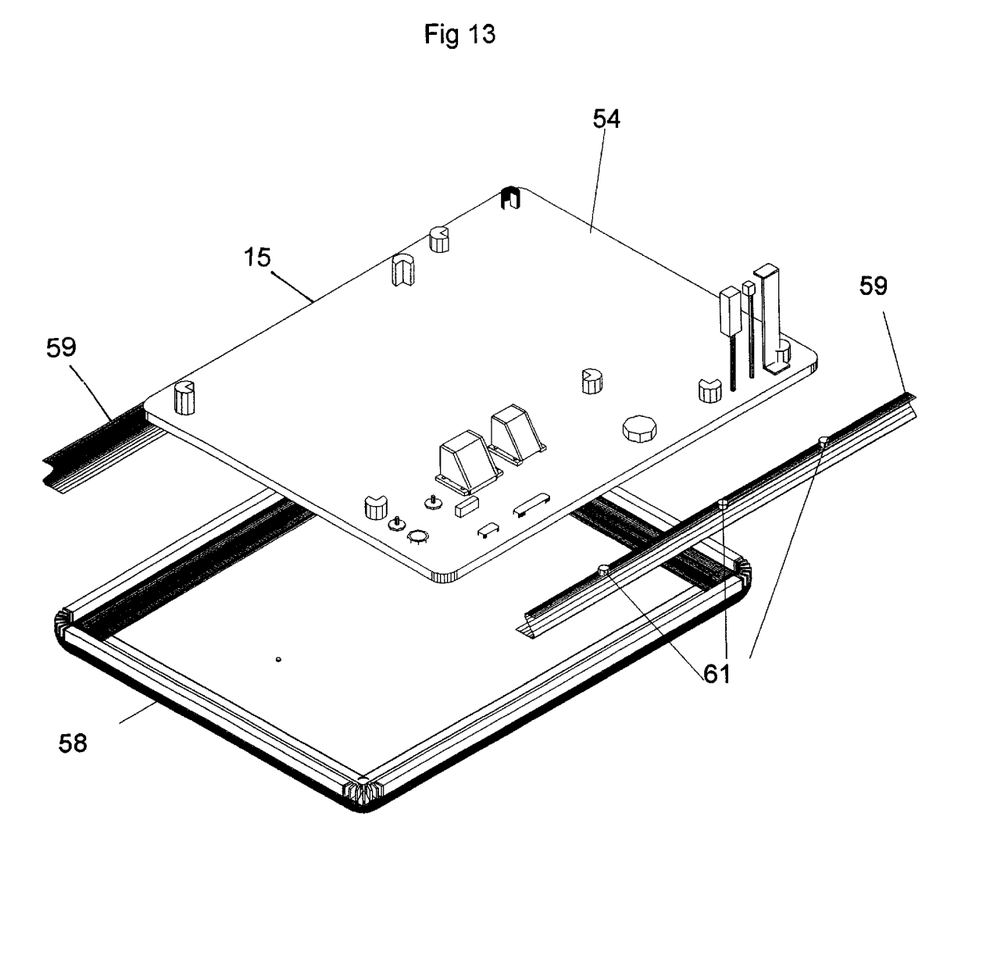
FIG. 13 is an exploded perspective view of case 1, illustrating structural details.

As shown in FIG. 2, the laptop computer 14 and printer 13 are mounted on an aluminum support panel 15. FIG. 13 and the description below details the structure and attachment mechanism for both case 1 and case 2. This panel also holds the system electronics and cabling on the bottom side. Case 1 features a very low profile, even with all electronics and peripherals attached. This low profile allows the system to be placed on a table and used exactly as it stands with no modification to any items. Only a power switch 18 needs to be turned on and the system is ready for operation. If external AC power is used, an AC power cable connects to socket 16. If external DC power is used the cable connects to socket 17. The power switch 18 controls the external power connection from socket 16 and socket 17 to the internal power system. Another power-related port, a 16-pin power receptacle 9, carries DC power to the peripherals in case 2 from case 1, when a case-to power cable 3 is connected. This power is provided to the individual pins from the DC voltage converter within case 1. The power connection runs to case 2 with the power connectors 21 for the camera 28, the power connection 29 for a secure telephone 24 and the power cable connection inside the case 2 for the scanner 20 and the tape drive mechanism 23 below (not shown). This case-to-case power cable 3 mates with a similar port in case 2, item 25 in FIG. 3. The battery connected to the system can be disconnected by the switch 4.

Serial data connections from the laptop computer in case 1 to the peripherals in case 2 are made via a serial case-to-case cable 53, connecting the serial port 5 to the serial port 49 in case 2. Once this serial cable is connected, the switch 19 activates either the camera 21 data cable 22 or the secure telephone serial connection cable 29, all in case 2.

The external parallel port 7 connects to the case-to-case parallel cable 52 and is activated by switching from the data connection to the parallel printer 13 to the external parallel port 7 via the parallel switch 6. On case 2, the connection is made to the parallel port 30 and to either the scanner 20 or the tape drive 23 (below the scanner, not shown) via the data switch 50.

The holding mechanism for the computer consists of the upright supports 10 on the front (explained further in FIGS.

Figure 10:
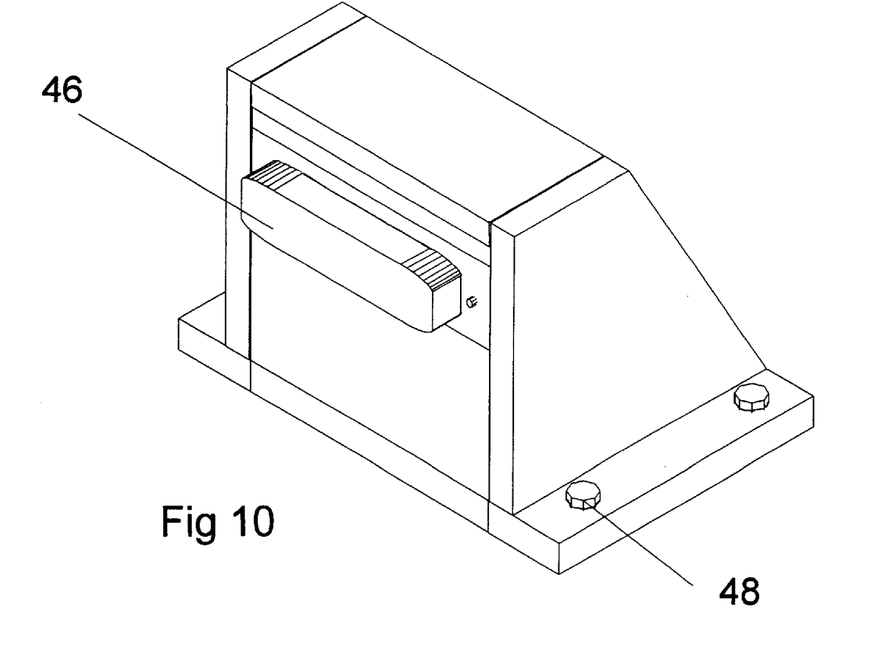
FIG. 10 is a perspective view of a data mount used to secure the laptop shown in FIG. 1, and make parallel and serial data connections to the system.
Figure 11:
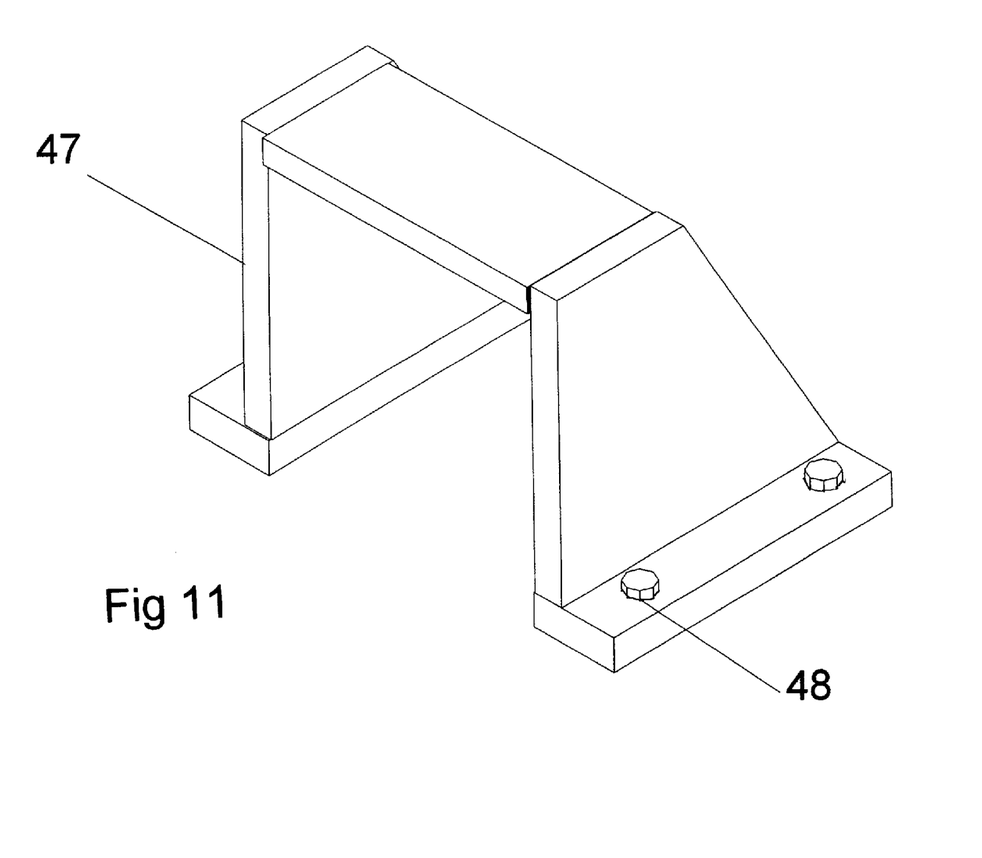
FIG. 11 is a perspective view of the flat ribbon cable data connector mounted on the support component of the datamount from FIG. 10, and a perspective view of the cover plate component of the data mount from FIG. 10.

6 & 7), the small low profile supports 11 on the back two corners of the laptop computer 14, and the serial and parallel data port connections 8 (these are also covered in FIGS. 10 and 11). All of these items work together to properly support the laptop computer 14 with a quick release capability when the laptop does need removal.

The smaller low profile supports 11 used on the laptop computer 14 are also placed at all Four Corners of the printer 13. Two upright brackets 12 have Velcro strapping that pulls across the top of the printer 13 to hold it in place between the supports 11. Alternative lower profile printers that are not so high are simply held in place with supports 10 placed at each corner of the printer. The function of these supports is described in detail in FIGS. 6 & 7.

FIG. 3 shows the base 27 of case 2, which is the peripheral case that can be optionally attached to case 1 to operate the peripherals including a secure or non-secure telephone 24, a digital camera 28, a scanner 20, and a tape backup drive 23 (below the scanner, not shown). On this rear view, the lid 34 has been removed. Once again the items are fully operable upon opening the case with the exception of the scanner 20, which must be placed in its base 33 for operation. The necessary connections include a single 16-pin power connector 25 that connects to item 9 of Case 1. A 9-pin serial cable 53 connects item 49 of case 2 to item 5 of case 1. A 25-pin parallel connector cable 52 runs from item 30 of case 2 to item 7 of case 1. Once these three cables are connected between the cases and power is applied to case 1, the system is fully operational and data switches activate the various peripherals without any other cable changes.

FIG. 3 illustrates the secure telephone 24 connected to the serial data connector 31 and to the power cable 3 at port 25, the scanner 20 sitting in its base 33, the tape drive 23 (not shown) sitting underneath the scanner mounted to the main aluminum panel 27 and a small hole where the digital camera power cable 21 and digital camera data cable 22 exit the aluminum panel 27. The data switches are also visible which provide the switching between the various peripherals in the system. The parallel data switch 50 controls parallel port connections from either the scanner 20 or the tape drive 23 in case 2 to the laptop computer 14 in case 1. When the system is ready for sport the scanner 20 is placed on its side on the foam supports item 26. A Velcro strap 51 is then wrapped around the scanner to hold it in place during transport. Another Velcro strap runs under the scanner base and holds the handset of the telephone 24 over the scanner base 33 during transport.

Mounting Mechanism Technology

The system components, except for the scanner 20, are functional as soon as the case system is opened, without need to shift or move components. No further trays or mechanismsare needed or used to make a fully operational system. The modular physical connector facilitates this capability. This capability is further enhanced by the use of a low profile base that holds the components. The system is at the desktop operating level when it is opened, so it is immediately ready for use without further adjustment.

The computer and peripherals are easily installed and removed from the system because they are held in place with a releasable locking mounting mechanism. The mechanism is described below and illustrated in FIGS. 6 & 7. The mounting mechanism consists of an upright cylindrical post 10, shown in FIG. 2, with a one quarter section removed. The structure provides a corner for engaging the corner of the computer or other component (illustrated in FIGS. 6 and 7 generally as a component 35), so the shape of the post 10 is not limited to cylindrical. One post 10 is placed at two or more corners of the component 35 and the flat faces prevent horizontal movement in any direction.

Figure 6:
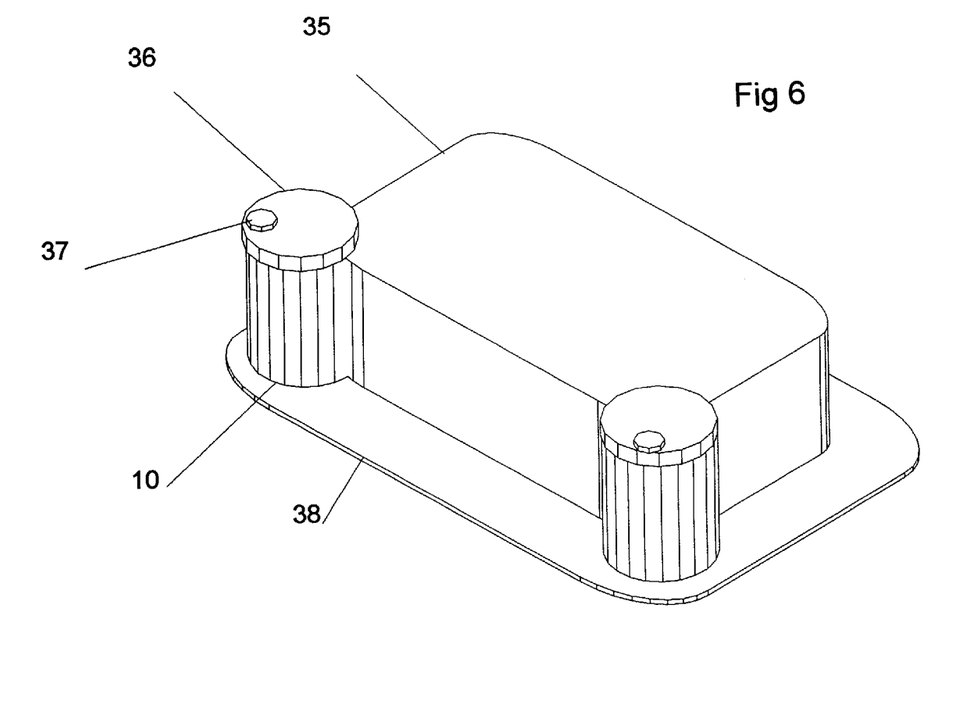
Figure 7:
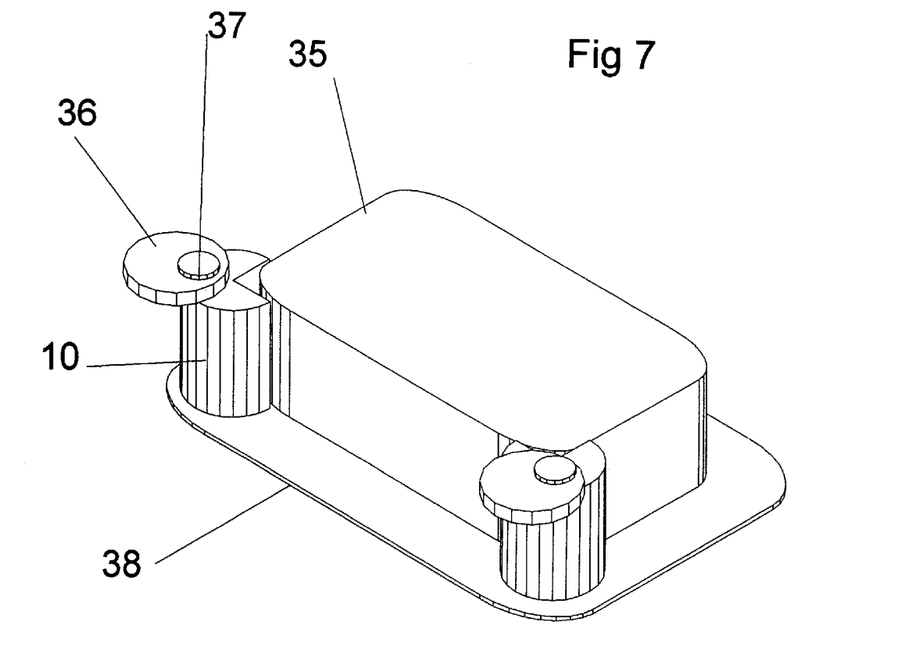
FIG. 7 is a perspective view like FIG. 6, showing the vertical support plates rotated to the open position.

The upward movement of the component 35 is prevented through the use of a metal cap in the form of a disc 36 that rotates on the post over the top of the component 35 and is hand-tightened via the small thumbscrew 37. This mounting mechanism can be used for various components, electronic equipment, medical equipment, etc., when mounted on a plate 38, which in this disclosure could be the panel 15 of the modular component plug-in boards 54, 55, and 56 described below. Note the small round flat caps 36 are rotated over the top of the object, and thumb screws 37, tightened down to hold both the caps and in turn the object being held in place from any vertical movement. The horizontal movement is prevented by the flat faces of the upright support mount 10 in the quarter cutout. As shown in FIG. 7, removal of the component 35 is accomplished by turning the thumbscrew 37 to loosen the disc 36, and rotating the disc 36 away from the quarter cutout in the support. In this position, the component being mounted can be slipped up and out of the support.

Figure 8:
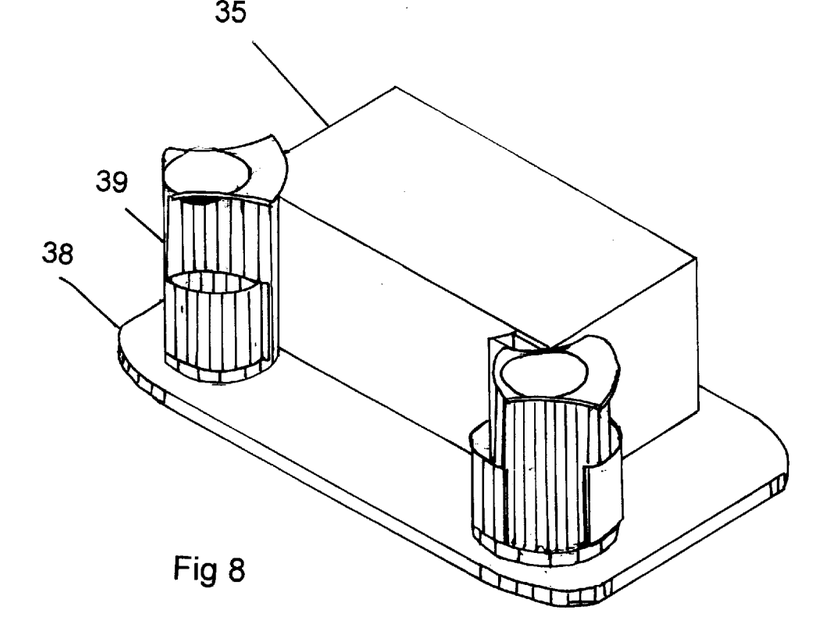
FIG. 8 is a perspective view of another mounting mechanism, shown in assembled and closed position.
Figure 9:
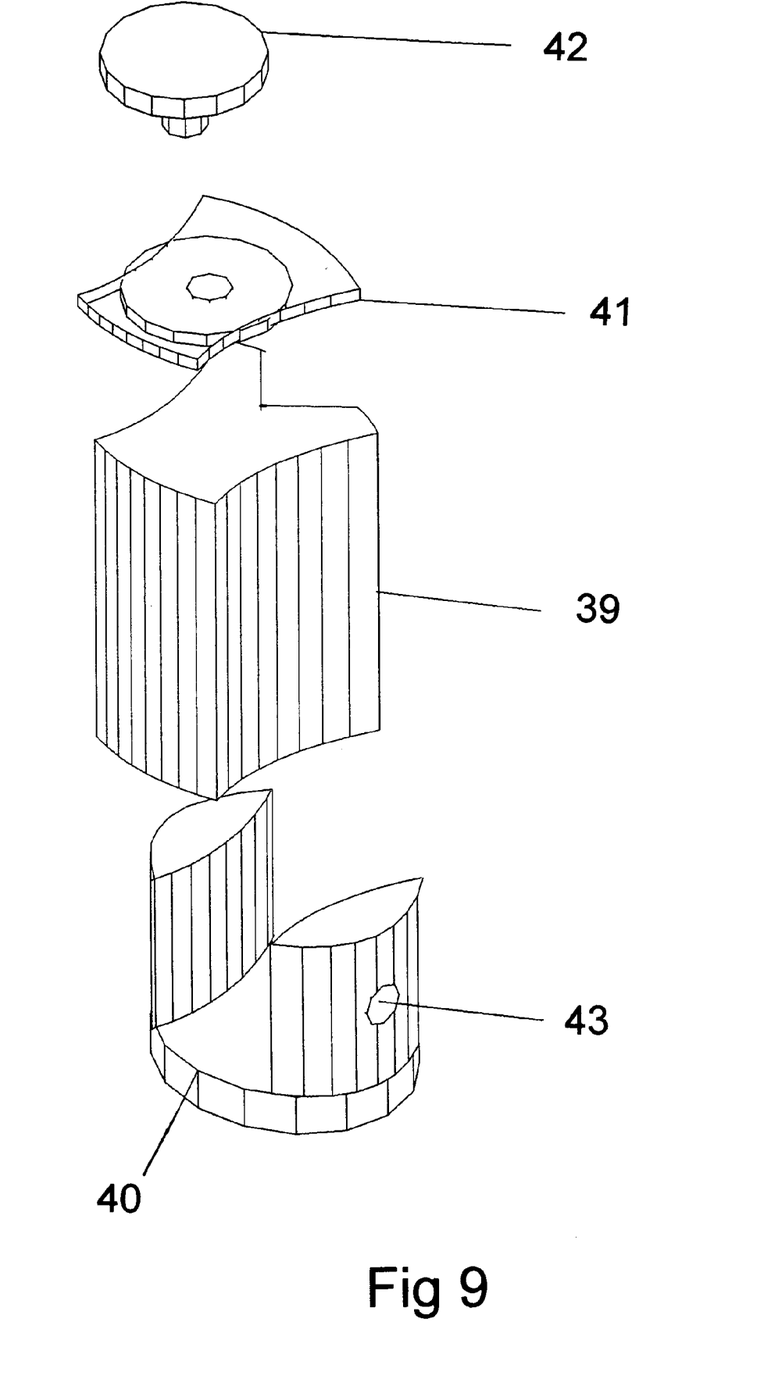
FIG. 9 is an exploded perspective view of the components of the mounting mechanism shown in FIG. 8.

As shown in FIGS. 8 and 9, another embodiment of the universal mounting mechanism is shown at 10' using some of the principles of the mount 10 shown in FIGS. 6 and 7, but offers in addition a universal mount adjustable to support objects of various heights. This height adjustment is done the first time the object is mounted or simply when the mounting system is manufactured. Thereafter the mount acts as a quick release system for the object being secured. The universal mounting mechanism 10' has a main mount 39 that slides vertically inside a support mount 40. Threaded holes in the uprights of the support mount 40 hold set screws 43 which when tightened hold the main support 39 at the proper height. The base of the support mount 40 has two holes, and two screws serve here to attach the mount to the aluminum panel 15 of the case system or wherever an object is being mounted. The support has a cutout or opening that corresponds to the object that will fit into it, i.e. usually a 90 degree opening which fits the corner of a laptop or peripheral. The flat faces of this opening prevent horizontal movement of the object. We now have a horizontal support that can be height adjusted to fit the dimension of the object being mounted. Now the challenge is to cap the support to prevent vertical movement of the computer or other object.

The upward support mechanism needs to be unobtrusive, yet easily moved out away from the support opening to allow the mounted object to be slid out from the supports. In this embodiment a round opening is cut into the top of the main mount 39. The cap is a flat piece of thin metal formed to allow a round thumbscrew to be inset into this round opening and tightened onto this thin metal to prevent movement of the cap. When loosened, the cap is rotated to the side freeing the top of the support to allow the removal of the mounted object. The inward curvature of the main mount 39 allows the thumbscrew 42 to be easily rotated by the thumb and forefinger to tighten the flat plate 41 to the mount 39. FIG. 8 shows a breakaway representation of the mounting mechanism.

Many other embodiments are envisioned for this capping mechanism. These include a cap hinged at the back top surface of the support that allows the cap to snap down onto the support. The complete support mechanisms of either type have two threaded holes at the bottom. Screws are placed through the supporting panel and attach to these threaded holes. The cylindrical mounting mechanism 10 and the is designed to be used not only for the peripherals presented in this application but also as a universal mounting mechanism for numerous computer, medical, aviation, and field deployment applications.

Data Dock Port

FIG. 10 shows the data mounts 8 that sit on the back of the portable computer 14 in position to plug into the data parts. These provide a type of docking mechanism and prevent the laptop from sliding at the back in either a horizontal or vertical direction.

As represented in FIGS. 10 and 11, the data mounts 8 are actually constructed of two parts. The L-shaped bracket 45 has a cutout that allows a 25-pin parallel connector 44 or a 9-pin-serial connector 44 with a flat ribbon cable to be mounted via screws on the sides of the connector. The ribbon cable connects to either a switch or simply another data connector on the aluminum panel 15 holding everything. The L-bracket itself is attached via two holes 46 on the base of the L-bracket 45. FIG. 11 shows a hood 47 that shields and protects the rest of the mounting mechanism. It fits snug over the L-bracket 45, leaving no open space around the upright leg of the L-bracket 45, and mounts to the panel 15 via holes 48. The lower or horizontal leg of the L-bracket terminates short of the back of the hood 47 and the ribbon cable passes through an opening in the panel 15 between the end of the L-bracket lower leg and the back of the hood 47.

This mount stays stationary and as the peripheral or computer is placed in the case it slides down between the cutout cylinders at the same time it is sliding into the data mounts. Once in place and secured by the discs on the cutout cylinders, the component is locked in place against vertical or horizontal movement. Furthermore this mechanism allows the data cables to be directed into the closed area of the case and out of the way of the user.

Mobile Micronetwork Technology

The data component of the micronetwork, illustrated in FIG. 4, provides connectivity to the peripherals from the portable computer 14 via the parallel port and an internal cable XX to a parallel switch 6 in the main case 1. The switch 6 enables routing of the data to either the printer 13 or the external parallel port 7. This external parallel port 7 can be connected to a corresponding parallel port 30 in the peripheral case 2 via a case-to-case parallel cable 52. An internal cable routed under the base in the peripheral case 2 connects the parallel port 30 to another parallel switch 50 that can be manually switched by the user to choose connectivity to either the scanner 20 or to the tape drive 23. The portable computer serial port connects to the external serial port 5 in the main case 1 and a case-to-case cable 53 connects the serial port 5 to a serial port 49 in the peripheral case 2. The serial connectivity can switched by way of a serial switch 19 between the camera 28 and the secure telephone 24.

The system may be provided with a universal serial bus (USB) connectivity option main case 1 and the peripheral case 2 have that is illustrated by the areas of the FIG. 4 with phantom lines. The laptop computer 14 has a USB port to which is connected an internal USB cable 69 routed under the base XX to the a USB port 68 on the main case 1. A USB case-to-case cable 62 can be plugged into the USB port 68 and into a corresponding USB port 71 on the peripheral case 2. The USB port 71 on the peripheral case 2 connects to a USB hub 72 via an internal USB cable 70 routed within the base of the peripheral case 2. The USB hub then provides four USB active ports supporting up to 500 ma power and the data connection. Internal cables (not shown) are installed to the peripherals from USB hub 72.

Modular Power Center

FIG. 5 illustrates the power distribution and conversion component of the micronetwork. The system is designed to take one of three single power sources, AC 100–240V, DC 12–24V, or 12V battery power and distribute this to each component in the system at the proper voltage level. The power system consists of the an AC to DC converter 64, a modular power center assembly, plug in power cards 69–76 supplying the power requirement of each device, a system control panel, one or more batteries 77, and the switches, cabling and connectors completing the system as a whole. The power center for this configuration is similarly innovative in its use of a single 12V–24V DC or 110–240V AC source for all peripherals in the system. The system can be set to automatically switch to battery operation when external power is interrupted. The system packaging is designed to be rugged and compact with good distribution of the heat generated during power conversion by use of potting materials having good heat conductivity and heat dissipation surfaces such as fins and the like. All power board modules are encased in epoxy-filled aluminum extrusions to assure that the heat is properly dissipated and the circuitry will withstand the rough environment encountered in portable use.

AC power is connected at the IEC port 16 and from there directly to item 64, an AC to DC power converter. The DC output from this converter runs to the DC Power switch 18. This switch in turn directs power from either the external DC power source or from the AD-DC converter to the modular power center assembly 65. Individual power cards represented by items 69 through 75 connect to the power center assembly 65 and provide either single or dual DC power output depending on the requirements of the peripherals it supplies. The battery charge module 76 supplies power to the battery 77 when the system is in charging mode and when the battery cutoff switch 4 is in the battery connect position. The peripherals in case 2 are powered when the system is turned on and the case-to-case power cable 3 is connected. When connected, the peripherals scanner 20, tape drive 23, digital camera 28, secure telephone 24 and an optional Universal Serial Bus (USB) hub 63 are powered. The USB hub will provide both power and data and thus if newer USB capable peripherals are placed in the peripheral case 2, the USB connection will replace the need for both a separate power source from the power motherboard or data connection from the serial and parallel ports. However, the USB connection itself needs a power source and this will still be provided via a power card on the power motherboard. Another option is to simply add more peripheral connections.

Modular Component Board Design

Figure 12:
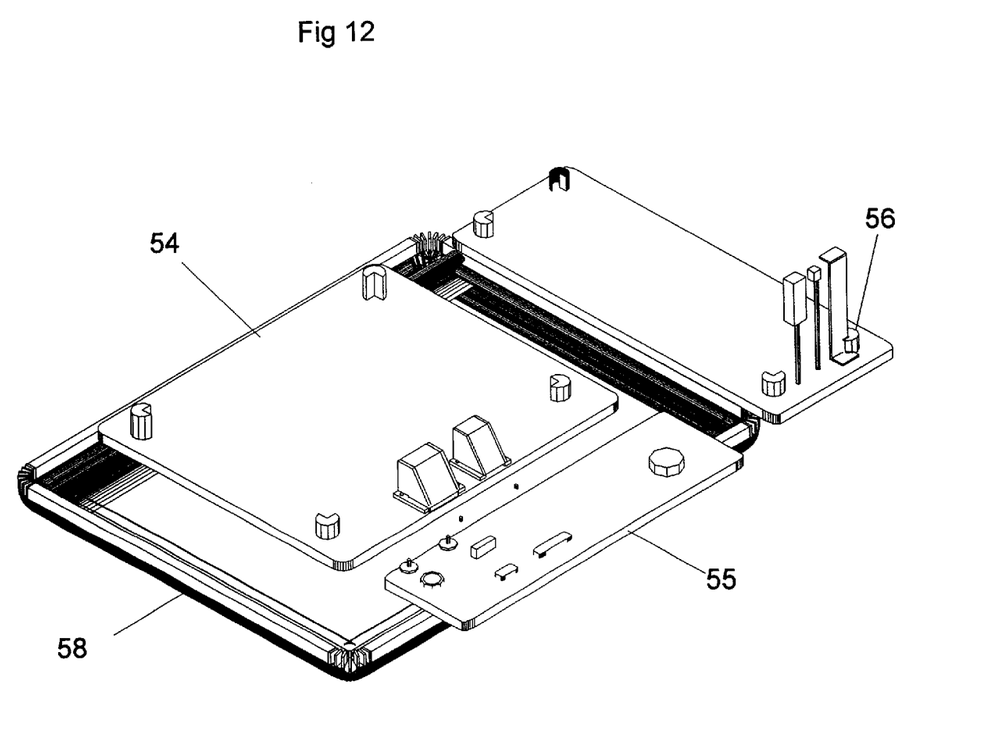
FIG. 12 is an exploded perspective view of the modular plug-in component cards that can optionally be used for quick replacement of system parts in the field.

The modular plug-in system, shown in FIG. 12, allows the user to replace components that need field replacement as well as the ability to add new capabilities to the system through the simple interchange of the modules. The panels are self-contained and each provides a specific function to the overall system. This system can be implemented in the base 15 of case 1, allowing a snap-in/snap-out replacement of the mount and electronics associated with a particular peripheral. This is an optional configuration of that presented above.

As an example, the component board 54 for the computer 14 holds the physical mounts, and the power/data interface and components to support the computer 14 within the system. If the computer needs to be swapped for another with a different size, this complete modular component board is changed. Correspondingly, the printer component board 56 has the physical mounts, and power/data interfaces necessary to hold the printer in the system. In this example, the third board 55 could hold a cellular phone or GPS system, data and power switches, and port interfaces to connect other devices or a second case.

To make a functional integrated system, the three individual component boards 54, 55, and 56 must have power and data connections to one another and to the base of the case. Two system design innovations are included to provide this connection. The preferred embodiment uses a vertical snap down connection for each component board to a power and data bus physically attached to the base of the case system. Data and power receptacles at the bottom of each component board plug in to a corresponding receptacle on the data/power bus. This in turn provides the circuitry and cabling to connect the data and power systems on the individual component cards. The component cards can optionally be connected via plugs on the side of the cards in a horizontal direction. Once all the cards are connected, the entire system can then be mounted into the base of the case. This is similar to connecting pieces of a puzzle and then placing the assembled article into its place.

The details of the physical structure of the main case 1, as shown in FIG. 13 includes three parts: 1) the actual base 58 of the case 1 representing the lower half of the outer shell of the external case, 2) two aluminum rails 59 with mounting holes 61, and 3) the aluminum panel 15 which supports the peripherals, the mounting mechanism, the electronics, and the cabling and switches for the data system. This panel is attached to the aluminum rails 59, which in turn are attached to the base 58. When completely assembled and loaded with peripherals, this is referred to as case 1 in FIGS. 1 and 2.

The panel support mechanism shown in FIG. 13 provides a robust, low profile construction. The metal rails 59 are 'Z'-shaped in cross section and attach to the base and sides of the case bottom 58 by rivets. This provides a strong flat surface with threaded holes 61 to attach the aluminum panel 15. This same support surface is used when attaching the modular components 54, 55, and 56 to the case. The rails 59 provide a resilient mount for the panel 15, and can yield slightly in the event of impacts and spread the impact shock somewhat, and they also strengthen the structural integrity of the case bottom 58.

Obviously, numerous modifications and variations of this preferred embodiment will occur to those skilled in the art in light of this disclosure. Accordingly, it is expressly to be understood that these modifications and variations, and equivalents thereof, shall be considered to be within the spirit and scope of invention as defined in following claims.

What is claimed is:

1. A mobile information and communication system having components for providing information processing and communication functions such as processing, scanning, printing, copying, secure communications, unclassified communications and data backup, comprising:

at least one case having a base with a floor and a removable lid, said base having a support panel with an upper side on which said components are mounted;

mounting structure for removably mounting said components to said upper side of said support panel against lateral or vertical translation away from said support panel;

rails for removably supporting said support panel in said base spaced above said floor;

a micronetwork that isolates, secures and simplifies the many data and power cables necessary to connect multiple electronic components such as a laptop computer, a scanner, a printer, a satellite or cellular telephone and a backup tape or CD drive, said micronetwork having a power supply, cables and electronics attached to the bottom side of said support panel and coupled through said panel by cables;

whereby said system is ready for use as soon as said lid is opened and said components may be changed out for service or replacement, and said support panel may be easily removed and replaced with a different panel for additional or different functions or for upgrades without discarding the entire system.

2. A mobile information and communication system as defined in claim 1, wherein:

said mounting structure includes corner mounts having a top-mounted rotating locking plate that prevents vertical movement of the mounted component when said locking plate is rotated over said components.

3. A mobile information and communication system as defined in claim 2 wherein:

said corner mounts including a mounting plate that tightens onto an adjustable vertical support mechanism preventing vertical movement of said component, said vertical support slides within a mountable base allowing the height of said support to be adjusted to the height of said component being mounted.

4. A mobile information and communication system as defined in claim 1, further comprising:

a modular component plug-in system having an integrated modular power system supporting the power requirements of multiple peripherals with power switching and power cable connectivity to all components in the system.

5. A mobile information and communication system as defined in claim 1, further comprising:

individual boards each having a specific function such as supporting and powering portable computer, supporting and powering printer, supporting switches, ports and cellular phone, etc.;

said individual boards having mechanical and electrical connections whereby they are snapped together to build a complete system.

6. A mobile information and communication system as defined in claim 1, further comprising:

a case mounted data and power bus providing data and power receptacle connections and card to card connectivity to said individual boards.

7. A mobile information and communication system as defined in claim 1, further comprising:

a universal serial bus cable and connectors therefor integrated to allow the connection of multiple components through said universal serial bus and connectors from said main case to a peripheral case, wherein said universal serial bus connection replaces both a separate power source from said power motherboard and data connection from said serial and parallel ports.

8. An integrated modular system supporting data processing and communication functions, such as digital imaging, scanning, printing, copying, secure and open voice and digital communications and data backup, comprising:

a case having a base and a lid removable from said base, said base having a support panel therein having a top side and a bottom side;

rails in said case base for connecting said support panel in a stand-off position above said base;

a plurality of electronic components for performing said functions, said components being removably secured to said top side of said support panel by hold-down devices that prevent lateral and vertical translation of said components relative to said base;

electrical connectors positioned adjacent to said components to electrically connect said components to suitable signal transmission cables and power cables attached to said connectors;

a set of connectors and switches on said support panel, and interconnecting cable, batteries, and system electronics secured to said bottom side of said support panel, said connectors, switches, interconnecting cable, and system electronics constituting a micronetwork for interconnecting said components as desired by an operator.

9. An integrated modular data processing and communication system as defined in claim 8, wherein:

said hold-down devices include posts having corner cutouts for engaging corners of said components.

10. A process of assembling a data processing and communication system, comprising:

selecting at least one case having a removable cover in which electronic components can be secured;

mounting a base in said case, said base having a floor and an edge support, said floor being supported in said case spaced on said edge support to provide a space between said floor and said case for accommodating internal cables for interconnecting said components, said base having corner mounting hardware for securing said components against lateral or vertical movement in said case relative to said base and electrical connectors for connecting said component electrically into a micronetwork;

installing said components on said base with said connectors plugged into electrical sockets in said components and said mounting hardware and electrical connectors securing said components against movement relative to said base.

11. A mobile information and communication system as defined in claim 1, further comprising:

said stand-off support structure for said support panel includes edge supports fastened to said case for supporting and cushioning said system components.

12. A mobile information and communication system as defined in claim 11, wherein:

said edge supports include at least two rails with mounting holes.

13. A mobile information and communication system as defined in claim 12, wherein:

said rails are 'Z'-shaped in cross section and attached to the sides of said case base.

14. A mobile information and communication system as defined in claim 12, further comprising:

said support panel having threaded holes therein and to receiving fasteners by which said mounting mechanisms are fastened into said case for supporting said components;

said panel being attached to said rails, which in turn are attached to said case, thereby providing a strong flat surface.

15. A mobile information and communication system as defined in claim 12, wherein:

said rails are resilient, and yield slightly in the event of impacts, thereby providing a resilient mount for said panel that spreads impact shock; and said rails strengthen the structural integrity of said case.

16. A mobile information and communication system as defined in claim 13, further comprising:

a cable run beneath said base panel.

17. A mobile information and communication system as defined in claim 11, further comprising:

three individual component boards;

power and data connections between said component boards and to said case.

18. A mobile information and communication system as defined in claim 17, further comprising:

a vertical snap down connection for each component board to a power and data bus physically attached to the base of the case system;

data and power receptacles at the bottom of each component board plug in to a corresponding receptacle on the data/power bus, providing circuitry and cabling to connect the data and power systems on said individual component cards.

19. A mobile information and communication system as defined in claim 17, further comprising:

side plugs on said cards for connecting said cards electrically in a horizontal direction.

* * * * *